United States Patent Office 2,768,148
Patented Oct. 23, 1956

2,768,148

SOLUTION POLYMERIZATION OF ACRYLONITRILE

Calvin E. Schildknecht, Montclair, and Mary L. Wallace, Summit, N. J., assignors to Celanese Corporation of America, New York, N. Y., a corporation of Delaware No Drawing. Application November 1, 1952,
Serial No. 318,330

15 Claims. (Cl. 260—30.4)

This invention relates to polymers and relates more particularly to an improved process for the production of acrylonitrile polymers.

The homopolymers and copolymers of acrylonitrile are becoming of increasing importance in the production of textile materials such as filaments, yarns and the like. In the manufacture of these textile materials, the acrylonitrile polymers are dissolved in a solvent to form a spinning solution or dope which is pumped or otherwise forced through a spinnerette, containing one or more spinning apertures, into a coagulating medium which may be a liquid or gas. Heretofore, it has been the general practice to carry out the polymerization in one medium, recover the polymer from the said medium, wash and dry or otherwise purify the same, and dissolve the polymer in the spinning solvent. Attempts to eliminate these steps by carrying out the polymerization in the spinning solvent have not met with any success. For example, when it is attempted to prepare acrylonitrile polymers in N,N-dimethylformamide, which is a widely used solvent for acrylonitrile polymers, there is obtained an orange or brown solution of polymers whose intrinsic viscosity is too low to give textile materials of good properties on spinning.

It is an important object of this invention to provide a process for the production of acrylonitrile polymers which will be free from the foregoing and other difficulties and which will be especially efficient in operation.

A further object of this invention is to provide a process for the production of acrylonitrile polymers that will yield directly polymer solutions that may be employed for the spinning of textile materials or the like.

Other objects of this invention will be apparent from the following detailed description and claims.

According to the present invention, it has been found that solutions of polymers of acrylonitrile of good color and having a sufficiently high intrinsic viscosity to yield textile materials of good properties on spinning may be obtained by carrying out the polymerization in a solvent selected from the class of cyclic organic carbonates and lactones. When the polymerization is carried out in these solvents, there are obtained clear solutions that are either colorless or exhibit only a slight color and which may be employed as spinning dopes with little or no further treatments. In carrying out the polymerization, there is employed a free-radical-liberating polymerization catalyst and the polymerization medium has carbon dioxide dissolved therein so as to displace any oxygen therefrom.

The polymers of acrylonitrile that may be prepared in accordance with the process for this invention include polyacrylonitrile, itself, as well as copolymers of acrylonitrile with other polymerizable unsaturated compounds such as, for example, vinyl esters, vinyl ethers, acrylic esters, acrylamides and fumaric esters. A particularly valuable class of copolymers are those obtained by copolymerizing with the acrylonitrile an N-vinyl lactam such as, for example, N-vinyl alpha pyrrolidine, N-vinyl alpha piperidone and N-vinyl caprolactam. The percentage of acrylonitrile in the polymers will vary depending upon the properties it is desired to obtain in the final products and may range from as low as about 50 mole percent to as high as about 99 mole percent. For use in the production of textile materials the polymers should in general contain at least about 70 mole percent of acrylonitrile, but preferably between about 80 and 99 mole percent of acrylonitrile. Copolymers containing less than 70 mole percent of acrylonitrile do not normally exhibit good fiber forming properties, but may be employed for the production, for example, of adhesives and coating and dipping compositions. In some cases, they may also be employed for the preparation of films.

A particularly valuable class of cyclic organic carbonates that may be employed in carrying out the process of the present invention are the aliphatic cyclic carbonates such as, for example, ethylene carbonate, propylene carbonate, trimethylene carbonate, 1,2-butylene carbonate, 2,3-butylene carbonate and isobutylene carbonate. Examples of lactones that may be employed in carrying out the process of this invention include lactones containing 3 to 6 carbon atoms in the ring and their derivatives. The aliphatic lactones such as, for example, gamma butyrolactone, beta propiolactone, gamma isocaprolactone, gamma n-caprolactone, gamma diethylbutyrolactone and gamma valerolactone are especially valuable for this purpose.

The concentration of the monomers in the polymerization medium may range from as little as about 5% by weight, or even less, to about 90% by weight. However, the use of extremely low concentrations is uneconomic since it requires the handling of unnecessarily large volumes of solution so that it is preferred to employ a concentration of monomers of at least about 10% by weight to cause the polymerization to proceed there is employed from about 0.1 to 2.0% by weight, based on the weight of the monomers, of a free-radical-liberating catalyst such as, for example, an organic peroxide or percarbonate, an inorganic peroxide or persulfate, or an azo compound. For best results, there is employed a free-radical-liberating catalyst that will be effective at a temperature of below about 60° C. since it is found that polymers having superior properties and a better color are produced when the polymerization is carried out at temperatures below this level. Free-radical-liberating catalysts that are operative at these low temperatures include, for example, methyl ethyl ketone peroxide, isopropyl percarbonate, 2,4-dichlorobenzoyl peroxide, and azo-bis-isobutyronitrile (also called $\alpha, \alpha'$-azodiisobutyronitrile).

The polymerization may be carried out at temperatures ranging from about 0 to 100° C. and will normally be completed in about ½ to 50 hours. However, for reasons pointed out above, it is best to carry out the polymerization at temperatures of between about 20 and 60° C., at which temperatures it will normally be completed in about 1 to 20 hours.

During the polymerization, air and other oxygen containing gases should be excluded from the polymerization medium by dissolving in said medium an inert gas to avoid inhibiting the polymerization. While it has been found that nitrogen is effective in excluding oxygen, superior results are obtained, particularly with respect to the color of the polymer produced, by employing carbon dioxide for this purpose. The carbon dioxide may be dissolved in the polymerization medium by bubbling a stream of carbon dioxide into said medium. To insure that all the oxygen is excluded from the polymerization medium, the said medium may advantageously be saturated with the carbon dioxide.

The solutions produced by the process of this invention may be employed, for example, without further treatment for the spinning of textile materials or for other purposes. It may, however, be desirable to treat the said solutions so as to remove therefrom any unreacted acrylonitrile. One manner in which this may be readily achieved is to subject the solution to a vacuum distillation or evaporation until all the acrylonitrile has been separated therefrom. Where desired, the polymer may, of course, be precipitated or otherwise recovered from the solution obtained at the end of the polymerization.

The solutions may have added thereto pigments, dyes, ultra-violet absorbents, softeners or plasticizers or other substances capable of changing the properties or appearance of the final products.

The following examples are given to illustrate this invention further.

*Example I*

A mixture of 47.5 parts by weight of acrylonitrile and 2.5 parts by weight of N-vinyl pyrolidone is dissolved in 158 parts by weight of gamma butyrolactone. There is added to this solution a piece of Dry Ice and 0.25 part by weight of methyl ethyl ketone peroxide (60% solution in dimethyl phthalate) and the polymerization is continued for 6 hours, during which time carbon dioxide is continuously bubbled through the solution and the temperature ranges from 22 to 28° C. There is obtained a clear amber viscous solution containing 23% by weight of polymer or a yield of polymer equivalent to 95% of theoretical. The polymer has an acrylonitrile content of 94 mole percent as determined by nitrogen analysis and an intrinsic viscosity of 1.8 when measured using 0.10 gram in 100 milliliters of dimethyl formamide solution. The polymer is wet spun into filaments without difficulty, the filaments after drawing having a tenacity of between 2.0 and 2.7 grams per denier and an elongation of between 9.6 and 9.9%.

*Example II*

A mixture of 47.5 parts by weight of acrylonitrile and 2.5 parts by weight of N-vinyl pyrrolidone is dissolved in a mixture of 142 parts by weight of ethylene carbonate and 16 parts by weight of propylene carbonate. There is added to this solution 0.25 part by weight of methyl ethyl ketone peroxide (60% solution in dimethyl phthalate) and the polymerization is continued for 6 hours, during which time the temperature ranges from 30 to 88° C. There is obtained a clear, nearly colorless solution containing 15% by weight of polymer or a yield equivalent to 64% of theory. The polymer has an intrinsic viscosity of 2.6 when measured, using 0.10 gram in 100 milliliters of dimethyl formamide solution. The polymer solution may be employed directly for spinning of textile materials. The solution obtained using the mixture of ethylene carbonate and propylene carbonate remains liquid at room temperatures, which is a great advantage since it permits handling and spinning at such temperatures. Ethylene carbonate alone freezes at 35° C.

It is to be understood that the foregoing detailed description is given merely by way of illustration and that many variations may be made therein without departing from the spirit of our invention.

Having described our invention, what we desire to secure by Letters Patent is:

1. In a process for the production of polymers of acrylonitrile containing at least 70 mole percent of acrylonitrile, the improvement which comprises carrying out the polymerization in a solvent selected from the class consisting of aliphatic cyclic carbonates and lactones, containing 3 to 6 carbon atoms in the ring, that will not enter into the polymerization reaction.

2. In a process for the production of polymers of acrylonitrile containing at least 70 mole percent of acrylonitrile, the improvement which comprises carrying out the polymerization in an aliphatic cyclic carbonate that will not enter into the polymerization reaction.

3. In a process for the production of polymers of acrylonitrile containing at least 70 mole percent of acrylonitrile, the improvement which comprises carrying out the polymerization in an aliphatic lactone, containing 3 to 6 carbon atoms in the ring, that will not enter into the polymerization reaction.

4. In a process for the production of polymers of acrylonitrile containing at least 70 mole percent of acrylonitrile, the improvement which comprises carrying out the polymerization in a solvent selected from the class consisting of aliphatic cyclic carbonates and lactones, containing 3 to 6 carbon atoms in the ring, that will not enter into the polymerization reaction in the presence of a free-radical-liberating catalyst.

5. In a process for the production of polymers of acrylonitrile containing at least 70 mole percent of acrylonitrile, the improvement which comprises carrying out the polymerization in a solvent selected from the class consisting of aliphatic cyclic carbonates and lactones, containing 3 to 6 carbon atoms in the ring, that will not enter into the polymerization reaction, said solvent having carbon dioxide dissolved therein.

6. In a process for the production of polymers of acrylonitrile containing at least 70 mole percent of acrylonitrile, the improvement which comprises carrying out the polymerization at a temperature of between about 20 and 60° C. in a solvent selected from the class consisting of aliphatic cyclic carbonates and lactones, containing 3 to 6 carbon atoms in the ring, that will not enter into the polymerization reaction in the presence of a free-radical-liberating catalyst that is operative at a temperature below about 60° C.

7. In a process for the production of polymers of acrylonitrile containing at least 70 mole percent of acrylonitrile, the improvement which comprises carrying out the polymerization at a temperature of between about 20 and 60° C. in a solvent selected from the class consisting of aliphatic cyclic carbonates and lactones, containing 3 to 6 carbon atoms in the ring, that will not enter into the polymerization reaction in the presence of from about 0.1 to 2.0% by weight based on the weight of the monomers of a free-radical-liberating catalyst that is operative at a temperature below about 60° C.

8. In a process for the production of copolymers of acrylonitrile and another compound capable of copolymerizing with the acrylonitrile and containing at least 70 mole percent of acrylonitrile, the improvement which comprises carrying out the polymerization at a temperature of between about 20 and 60° C. in a solvent selected from the class consisting of aliphatic cyclic carbonates and lactones, containing 3 to 6 carbon atoms in the ring, that will not enter into the polymerization reaction in the presence of from about 0.1 to 2.0% by weight based on the weight of the monomers of a free-radical-liberating catalyst that is operative at a temperature below about 60° C.

9. In a process for the production of copolymers of acrylonitrile and an N-vinyl lactam and containing at least 70 mole percent of acrylonitrile, the improvement which comprises carrying out the polymerization in a solvent selected from the class consisting of aliphatic cyclic carbonates and lactones, containing 3 to 6 carbon atoms in the ring, that will not enter into the polymerization reaction.

10. In a process for the production of copolymers of acrylonitrile and an N-vinyl lactam, there being present between about 80 and 99 mole percent of acrylonitrile, the improvement which comprises carrying out the polymerization in a solvent selected from the class consisting of aliphatic cyclic carbonates and lactones, containing 3 to 6 carbon atoms in the ring, that will not enter into the polymerization reaction.

11. In a process for the production of copolymers of acrylonitrile and an N-vinyl lactam and containing at least 70 mole percent of acrylonitrile, the improvement which comprises carrying out the polymerization in a solvent selected from the class consisting of aliphatic cyclic carbonates and lactones, containing 3 to 6 carbon atoms in the ring, that will not enter into the polymerization reaction in the presence of a free-radical-liberating catalyst, said solvent having carbon dioxide dissolved therein.

12. In a process for the production of copolymers of acrylonitrile and an N-vinyl lactam and containing at least 70 mole percent of acrylonitrile, the improvement which comprises carrying out the polymerization in an aliphatic cyclic carbonate that will not enter into the polymerization reaction at a temperature of between about 20 and 60° C. in the presence of from about 0.1 to 2.0% by weight based on the weight of the monomers of a free-radical-liberating catalyst that is operative at a temperature below about 60° C.

13. In a process for the production of copolymers of acrylonitrile and an N-vinyl lactam and containing at least 70 mole percent of acrylonitrile, the improvement which comprises carrying out the polymerization in an aliphatic lactone, containing 3 to 6 carbon atoms in the ring, that will not enter into the polymerization reaction at a temperature of between about 20 and 60° C. in the presence of from about 0.1 to 2.0% by weight based on the weight of the monomers of a free-radical-liberating catalyst that is operative at a temperature below about 60° C.

14. In a process for the production of copolymers of acrylonitrile and N-vinyl pyrrolidone and containing at least 70 mole percent of acrylonitrile, the improvement which comprises carrying out the polymerization in gamma butyrolactone.

15. In a process for the production of copolymers of acrylonitrile and N-vinyl pyrrolidone and containing at least 70 mole percent of acrylonitrile, the improvement which comprises carrying out the polymerization in a mixture of ethylene carbonate and propylene carbonate.

References Cited in the file of this patent

UNITED STATES PATENTS

| | | |
|---|---|---|
| 2,335,454 | Schuster et al. | Nov. 30, 1943 |
| 2,436,926 | Jacobson | Mar. 2, 1948 |
| 2,471,959 | Hunt | May 31, 1949 |
| 2,570,200 | Bruson | Oct. 9, 1951 |
| 2,570,201 | Bruson | Oct. 9, 1951 |
| 2,585,537 | Coffman | Feb. 12, 1952 |

FOREIGN PATENTS

| | | |
|---|---|---|
| 638,331 | Great Britain | June 7, 1950 |